United States Patent Office 3,523,091
Patented Aug. 4, 1970

3,523,091
LANTHANUM, YTTRIUM SILICATE PHOSPHORS
William A. McAlister, Convent Station, N.J., assignor to Westinghouse Electric Corporation, Pittsburgh, Pa., a corporation of Pennsylvania
No Drawing. Filed Oct. 27, 1967, Ser. No. 678,510
Int. Cl. C09k 1/54
U.S. Cl. 252—301.4                10 Claims

ABSTRACT OF THE DISCLOSURE

Phosphor compositions are lanthanum silicate, yttrium silicate, or lanthanum-yttrium silicate activated by terbium, europium, or mixtures thereof. The lanthanum or yttrium may be substituted for in part by the alkaline earth metals and selected metals. The phosphors radiate efficiently at particular visible regions of the spectrum when excited by ultraviolet radiation.

BACKGROUND OF THE INVENTION

This invention relates to phosphors, and more particularly to rare-earth metal activated line-emitting silicate phosphors.

A great deal of interest has been generated in phosphors utilizing rare-earth metal activators because of their property of efficiently emitting substantially at a characteristic wavelength. Such a property is attractive with use with arc discharge devices.

A line emitting phosphor concentrates its output energy substantially at a particular wavelength. For this reason it will generally be more efficient in producing a particular color than a broad band emitting phosphor. Efficient line emitting phosphors are also useful in blends.

Lanthanum silicate activated by cerium is taught by Overbeek in Pat. No. 2,467,689 dated Apr. 19, 1949. Calcium and magnesium silicate activated by terbium is taught by the present applicant in Pat. No. 3,260,675 dated July 7, 1966. Terbium and europium are well known as phosphor activators. The use of lithium to promote phosphor formation and efficiency is also known.

SUMMARY OF THE INVENTION

It is an object of this invention to produce a novel phosphor which will efficiently convert ultraviolet radiation to visible light substantially about a particular wavelength of the visible spectrum.

It is another object to utilize novel phosphors which utilize rare-earth activators to effect this purpose.

It is a further object to provide a method of producing such an efficient line emitting phosphor.

These objects and others are accomplished by preparing an efficient phosphor composition expressible by the general formulation $xLn_2O_3 \cdot ySiO_2 : zLn'$, wherein Ln is lanthanum, yttrium, or mixtures thereof, and Ln' is terbium, europium, or mixtures thereof. An alternative method of preparation is also provided wherein ammonium chloride, or lithium carbonate fluxes are added to the raw mix before firing.

DESCRIPTION OF THE PREFERRED EMBODIMENTS

The following specific examples explain the preparation of the phosphors of the present invention:

Example I

As a specific example, 0.5 mole of $La_2O_3$ is thoroughly mixed with one mole of $SiO_2$, to which is added 0.03 mole of $Tb_4O_7$ which represents a commercially available oxide mixture, and 0.25 mole of $Li_2CO_3$. The mixture is fired in a slightly reducing atmosphere of $N_2$–$H_2$, which is about 0.5% by volume $H_2$, for at least one-half hour at a temperature of from 1000° C. to 1300° C. with the higher the temperature the shorter the firing time. The resulting phosphor is mechanically grounded to finely divided status, and then similarly refired and reground. While a nitrogen-hydrogen atmosphere is preferred, other slightly reducing atmospheres can be used.

Example II

In another embodiment, 0.5 mole of $Y_2O_3$ is thoroughly mixed with one mole of $SiO_2$, to which is added 0.03 mole of $Eu_2O_3$ and 0.25 mole of $Li_2CO_3$. The mixture is fired in air for at least one-half hour at a temperature of from 1000° C. to 1300° C. with the higher the temperature the shorter the firing time. The phosphor is mechanically ground to finely divided status, and then similarly refired and reground. The phosphor can also be fired in any atmosphere comprising oxygen. In either case the emission is red and consists of lines characteristic of $Eu^{+3}$, when 254 or 365 nm. excitation is used.

Example III

In still another embodiment, one liter of 1.0 molar $Y(NO_3)_3$ solution and one liter of 0.2 molar $Tb(NO_3)_3$ solution, prepared by dissolving the oxides in concentrated $HNO_3$ and diluting to volume with water, are stirred together and heated to 80° C. A two liter solution of 1.0 molar oxalic acid is stirred into the rare-earth solutions and the resulting mixture heated to about 80° C. An yttrium-terbium oxalate is coprecipitated and the precipitate is allowed to stand at this temperature for about a half hour. The precipitation temperature is not critical but a temperature of about 80° C. allows for efficient precipitation. The precipitate is washed with distilled water and allowed to dry. The oxalates are mixed with 1.5 mole of silica and uniformly ground. The mixture is fired twice at 1450° C. for two hours each time in a slightly reducing atmosphere as in Example I. The firing temperature is preferably from 1300°–1500° C. The firing time can be varied with the lower the temperature, the longer the firing time. The molarity of the rare-earth solutions and the ratios between them can be varied within the limits which satisfy the ratio of rare-earth metals desired in the phosphor composition. This phosphor when excited by ultraviolet radiation emits the characteristic green terbium ($Tb^{+3}$) emission.

Example IV

In still another example, one liter of a 1.0 molar $Y(NO_3)_3$ solution, one liter of an 0.2 molar $Tb(NO_3)_3$ solution are mixed together. The rare earth nitrates are prepared as explained in the preceding example by dissolving the rare-earth oxides in concentrated $HNO_3$ and diluting to volume with distilled water. A two-liter solution of 1.0 molar oxalic acid is then stirred in and the resulting mixture is heated, as explained before, to coprecipitate the ternary yttrium-terbium-europium oxalate. The oxalate is mixed with 1.5 mole of silica and ground. This raw mix is fired at 1450° C. for two hours in the slightly reducing nitrogen-hydrogen atmosphere described in Example I. The resulting phosphor emits in the yellow region of the visible spectrum. Again the firing temperature and time are not critical and can be varied as explained in Example III. A similar firing in a nitrogen atmosphere has also been carried out.

Example V

In yet another embodiment, 0.45 mole of $Y_2O_3$ and 0.1 mole of $BaF_2$, $CaF_2$, $SrF_2$, or mixtures thereof are thoroughly mixed with one mole of $SiO_2$, to which is added 0.015 mole of $Tb_4O_7$ which is commercially available. This raw mix is then fired as specified in Example I.

The phosphor produced in the specific examples is thus expressible by $xLn_2O_3 \cdot ySiO_2:zLn'$, wherein Ln is yttrium, lanthanum, or mixtures thereof, and Ln' is terbium, europium, or mixtures thereof.

In these examples, the yttrium oxide and lanthanum oxide may be used to replace each other in whole or in part within the values expressed in the examples. Also, yttrium nitrate can be replaced in whole or in part by lanthanum nitrate in Examples III and IV. In all of the examples the amount of lanthanum or yttrium compounds in the raw mix can be varied to provide a phosphor of the aforementioned general formula wherein the ratio $x/y$ is from 0.25/1 to 1/1.

The amount of europium or terbium compound or mixtures thereof added to the raw mix in these examples can be varied to provide a phosphor of the aforementioned general formula wherein the ratio of $z/y$ is from 0.005/1 to 0.4/1.

In Example V alkaline-earth fluorides were added to the raw mix, other alkaline-earth compounds such as oxides or carbonates which are heat decomposable to the oxide can be similarly added to the raw mix. The alkaline-earth compounds can be added to the raw mix in an amount sufficient to supply a ratio of gram-atom of alkaline-earth metal to grame-mole of $Ln_2O_3$ of up to about 1/3.

Example VI

In still another embodiment, 0.8 mole of $Y_2O_3$ and 0.2 mole of $AlF_3$ are thoroughly mixed with one mole of $SiO_2$, to which is added 0.05 mole of $Tb_4O_7$ which is commercially available. The raw mix is fired in a $N_2$-$H_2$ atmosphere as explained in Example I for about two hours at 1200–1450° C. with the lower the temperature the longer the firing time.

Other selected metal compounds can be substituted for the aluminum fluoride in Example VI, such as the fluorides of cadmium and magnesium, the oxide or carbonates of cadmium, magnesium, and aluminum, as well as mixtures thereof. These selected metal compounds can be included in the raw mix in an amount sufficient to supply a ratio of gram-atoms of selected metal to gram-mole of $Ln_2O_3$ of up to about 1/3.

It has been found that various fluxes can be added to the raw mix in the examples and fired with the raw mix, thereby improving the phosphor brightness. In these examples, cadmium chloride or ammonium chloride can be added to the raw mix before firing in an amount of up to about 15 weight percent of the total raw mix. Similarly, lithium carbonate as illustrated in Example I can be added to the raw mix before firing in an amount of up to about 50 weight percent of the total raw mix.

The preferred firing temperature and firing time that is used in producing the phosphor of the invention is variable within the range of 1000° C. to 1500° C. and will be largely influenced by the nature and the amount of the flux used. Thus in Example I where lithium carbonate was added as a flux the preferred firing temperature is from 1000–1300° C. for periods as short as one-half hour. In Example IV where flux was not utilized, firings at 1450° C. for about two hours were preferred. The cadmium chloride and ammonium chloride when added to the raw mix allowed for similar reduction of the firing temperature and time.

The terbium activated phosphor specified in Example I emits substantially about the lines 540 and 550 nm. when excited by 254 nm. The europium activated phosphor specified in Example II emits substantially about the lines 585 and 612 nm. when excited by 254 nm. ultraviolet energy. The terbium-europium activated phosphor produced in Example IV has a generally yellow output as a result of blending of the line emissions of the terbium and europium activators.

It will be recognized that a novel phosphor has been provided that efficiently radiates visible light as line emission about a particular wavelength or a combination of such line emission when excited by ultraviolet radiation. A method of producing the efficient line emitting phosphor is also set forth.

I claim as my invention:

1. A phosphor composition expressible by the general formulation $xLn_2O_3 \cdot ySiO_2:zLn'$, wherein Ln is lanthanum, yttrium, or mixtures thereof, and Ln' is terbium, the ratio of $x/y$ is from 0.25/1 to 1/1, and the ratio of $z/y$ is from 0.005/1 to 0.4/1.

2. The phosphor specified in claim 1, wherein Ln is yttrium, Ln' is terbium, the ratio of $x/y$ is about 0.5/1, and the ratio of $z/y$ is about 0.12/1.

3. The phosphor as specified in claim 1, wherein a fluoride, oxide, or compound decomposable to the oxide of the metals calcium, strontium, barium, cadmium, magnesium aluminum, or mixtures thereof is included in the raw mix to supply a ratio of gram-atoms of said metal to gram-mole of $Ln_2O_3$ of up to about 1/3.

4. The phosphor as specified in claim 1, wherein Ln is yttrium, Ln' is terbium, the ratio of $x/y$ is about 0.8, the ratio of $z/y$ is about 0.2, and aluminum fluoride is included in the raw mix in a gram-mole amount that is about 1/4 of the gram mole amount of $Y_2O_3$ included therein.

5. The method of preparing a phosphor having the general formulation $xLn_2O_3 \cdot ySiO_2:zLn'$, wherein Ln is lanthanum, yttrium, or mixtures thereof, and Ln' is terbium, which method comprises:
   (a) preparing a raw mix of Ln oxide or Ln compound which is converted to oxide on firing, with Ln' oxide or Ln' compound which is converted to oxide on firing, silica, and ammonium chloride in an amount of up to 15 weight percent of said raw mix, or lithium carbonate in an amount of up to 50 weight percent of the raw mix; and
   (b) firing said raw mix at a temperature of from 1000° to 1500° C. for a predetermined time in a predetermined atmosphere.

6. The method as specified in claim 5, wherein said raw mix includes a predetermined amount of a fluoride, oxide, or compound decomposable to the oxide of the metals calcium, strontium, barium, cadmium, magnesium, aluminum or mixtures thereof.

7. The method as specified in claim 5, wherein said predetermined firing atmosphere is slightly reducing.

8. The method as specified in claim 5, wherein said lithium carbonate is added in an amount of about 8 percent by weight of said raw mix and said firing temperature is from 1000–1300° C., and said firing time is at least one-half hour.

9. The method as specified in claim 5, wherein said Ln and Ln' compound is a coprecipitated oxalate.

10. The method as specified in claim 9, wherein said firing temperature is about 1450° C. and said firing time is at least about two hours.

References Cited

UNITED STATES PATENTS

| | | |
|---|---|---|
| 3,250,722 | 5/1966 | Borehardt. |
| 3,260,675 | 7/1966 | McAllister. |
| 3,400,081 | 9/1968 | Brixner. |
| 3,420,781 | 1/1969 | McAllister. |

TOBIAS E. LEVOW, Primary Examiner

R. D. EDMONDS, Assistant Examiner